United States Patent [19]

Chapman

[11] Patent Number: 4,525,630

[45] Date of Patent: Jun. 25, 1985

[54] APPARATUS FOR DETECTING TAPE ON SHEETS

[75] Inventor: Christopher P. Chapman, Hayling Island, England

[73] Assignee: De La Rue Systems Limited, Portsmouth, England

[21] Appl. No.: 407,209

[22] Filed: Aug. 11, 1982

[30] Foreign Application Priority Data

Aug. 11, 1981 [GB] United Kingdom ................. 8124512

[51] Int. Cl.³ ............................................. G01H 21/88

[52] U.S. Cl. .................................... 250/572; 250/227; 356/446

[58] Field of Search ............... 250/562, 563, 572, 227; 356/445, 446, 448, 430

[56] References Cited

U.S. PATENT DOCUMENTS

| | | | |
|---|---|---|---|
| 3,806,256 | 4/1974 | Ishak | 356/446 |
| 4,162,126 | 7/1979 | Nakagawa | 356/430 |
| 4,298,807 | 11/1981 | Favre | 250/562 |
| 4,409,477 | 10/1983 | Carl | 250/227 |

FOREIGN PATENT DOCUMENTS

| | | | |
|---|---|---|---|
| 2299624 | 8/1976 | France | 356/446 |
| 53992 | 6/1982 | France | 356/446 |
| 894570 | 4/1962 | United Kingdom | 250/562 |

*Primary Examiner*—David C. Nelms
*Assistant Examiner*—Jim Gatto
*Attorney, Agent, or Firm*—Sughrue, Mion, Zinn, Macpeak and Seas

[57] ABSTRACT

Apparatus is disclosed for detecting the presence of shiny tape on a printed note, for example a banknote. An optical fibre fishtail array supplies visible light from a source (A) to a lengthwise strip of the banknote. A first array of photodetectors (D) detects light specularly reflected from a plurality of adjacent regions of the said strip, while a second array (B) arranged parallel to the first array (D) detects light reflected diffusely from corresponding ones of the said regions. An analyzing circuit receives signals from the photodetectors and indicates when the ratio of specularly reflected light from an illuminated element of the banknote to diffusely reflected light from the same element exceeds a predetermined value.

5 Claims, 5 Drawing Figures

APPARATUS FOR DETECTING TAPE ON SHEETS

This invention relates to sensing the condition of the surface of a sheet and in particular to detecting the presence of adhesive tape on printed notes, for example banknotes. When a banknote is torn, it is frequently repaired with adhesive tape and when a stack of banknotes is being sorted to remove those which are not fit for further circulation, it is desirable to include in the unfit notes those which have been repaired in this way.

The tape normally used to repair such notes has a shiny surface and the present invention is concerned with the detection of such shiny tape.

Apparatus according to the present invention comprises means for illuminating an element of the surface, means for receiving light reflected from the illuminated element and for converting such light into an electric signal and signal analysing means responsive to the said signal to indicate the presence of a flaw at that element of the surface; the apparatus is characterized in that to detect the presence of shiny tape on a moving printed note the illuminating means directs collimated beams of light at a plurality of adjacent regions forming a strip across the note in a direction perpendicular to its movement and in that the light-receiving means comprises a first array of light receivers arranged to receive light specularly reflected from the plurality of adjacent illuminated regions and to provide corresponding electric signals, and a second array of light receivers arranged to detect light diffusely reflected from corresponding ones of the said regions and to provide corresponding electric signals, the apparatus further comprising signal-analysing means receiving the signals from both arrays of light receivers and responsive to an increase in the ratio of the instantaneous values of the signals representing light reflected specularly and light reflected diffusely from any one of the said regions to provide a signal output indicative of the presence of shiny tape on the illuminated surface of the note.

The ratio between specularly reflected light and diffusely reflected light from the surface of a banknote does not vary greatly from element to element of that surface, in spite of the pattern printed on the banknote; both intensities vary in the same way, from element to element, with the reflectivity of the surface. However, when the banknote has been repaired with shiny tape, far more light is reflected specularly than diffusely where the illuminated element has a surface of shiny tape; this is so both the opaque and transparent tape, although in the case of transparent tape some light is transmitted through to the banknote surface and is there reflected diffusely and specularly in the normal way.

We are aware that optical inspection apparatus has been proposed in which a beam of light is repeatedly scanned across a moving surface, a photodetector detects light reflected from the surface and an electronic circuit senses a change in the level of the signal from the photodetector indicative of a flaw in the surface. We are also aware that in British patent specification No. 1592449 it is proposed to arrange two or three photodetectors side by side in a line perpendicular to the scanning direction to sense light reflected one each side of the angle of specular reflection, to detect changes in the output of each photodetector during the scannning and to correlate changes in the outputs of different photodetectors to indicate different types of surface fault.

The present invention differs from this disclosure in that the analysis of the signals is based not on changes in signals for successively scanned elements of a strip but in the ratio of specularly and diffusely reflected light from the same element. It is therefore capable of detecting, for example, a shiny tape extending across the whole illuminated strip of the banknote or extending across the banknote in the direction of banknote movement, and it will also ignore those changes in amounts of light from successive elements which are due, for example to the pattern printed on the banknote.

In the preferred embodiment of the invention, the means for illuminating a strip across the note comprises an optical fibre fishtail array, the bunched end of the array being adjacent to a single source of light and the other end of the array being adjacent the path of the note to provide the strip of illumination. The first and second arrays of light receivers are also formed by bundles of optical fibres which, at their ends adjacent the note path, form two lines parallel to the line formed by the output ends of the illuminating array. The collimated beam of visible light may be produced with the aid of a lens system, for example a collimating lens placed between the light source and the fishtail array. Preferably however, collimated beams of light are produced by arranging that each optical fibre illuminating an area of the sheet has a very low numerical aperture. For good beam collimation, the numerical aperture should be less than 0.3.

In order that the invention may be better understood, a preferred embodiment of the invention will now be described with reference to the accompanying drawings, in which.

The principle behind the detection of areas of shiny tape on a banknote is as follows. When a collimated beam of light is directed at a banknote on which there is no shiny tape, the ratio between the intensities of light reflected diffusely from an element of the banknote surface and light reflected specularly from the same element of the banknote surface remains substantially the same from element to element, although the amount of light may vary from element to element of the banknote surface. The ratio is substantially independent of the colour of the region of the banknote which reflects the light and is largely independent of the degree of soiling of the banknote. However, when a tear in the banknote has been repaired using an adhesive tape with a shiny surface, this greatly increases the proportion of light reflected specularly from the surface of the banknote. Of the remaining light, some undergoes diffuse reflection in the same surface and, if the tape is transparent, some is transmitted through the tape to the surface of the banknote, where it is reflected in the same way as it would be without the shiny tape. Thus, the overall ratio of specularly reflected light to diffusely reflected light is significantly greater for elements of the banknote surface which are covered with shiny tape.

Figure 1:
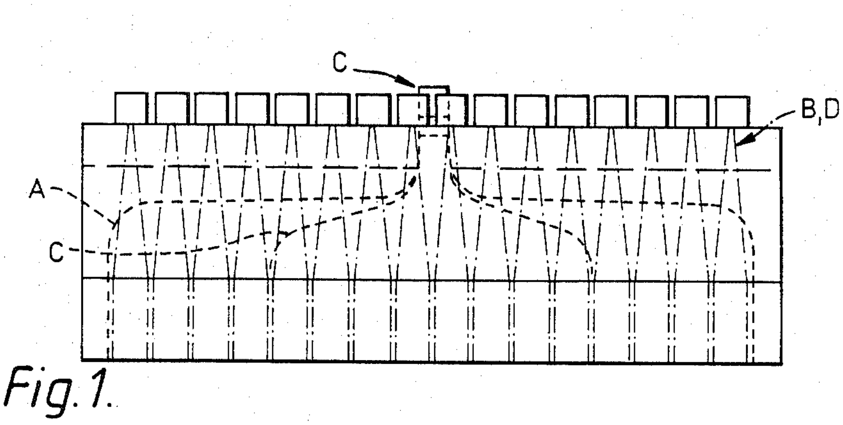
FIGS. 1, 2 and 3 show respectively a side elevation, a plan view, and an end elevation of a detector head embodying the invention.
Figure 2:
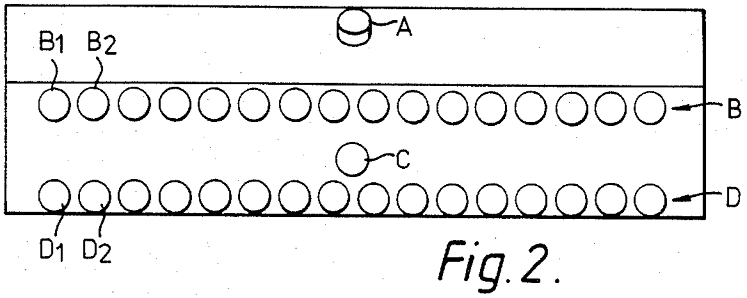
Figure 3:
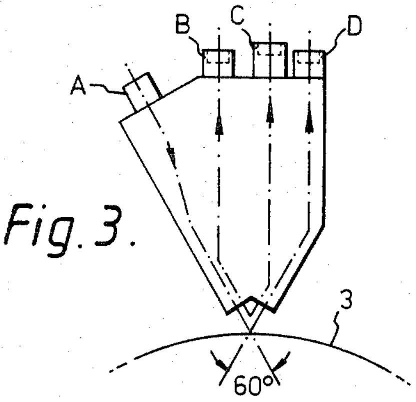

In the embodiment of the invention to be described, a detector head is used to cause a plurality of collimated beams, arranged in a line extending over the length of the banknote, to scan across the banknote in the direction of its width. The detector head is shown in side view in FIG. 1, in plan view in FIG. 2 and in end view in FIG. 3. It includes bundles of optical fibres A, B, C and D. A banknote 3 perpendicular to the plane of the drawing is caused to move in a direction perpendicular to the length of the detector head (see FIG. 3).

Figure 5:
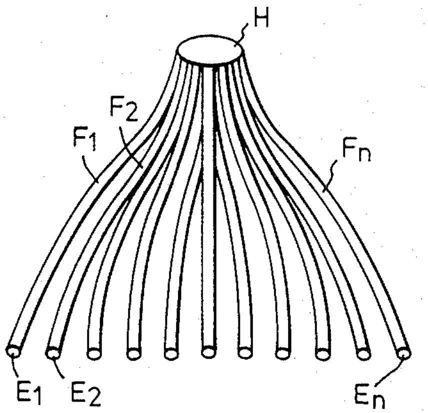
FIG. 5 is a sketch of a fibre optic fishtail array.

A plurality of adjacent regions, forming a strip across the banknotes, are illuminated by means of a lamp and the optical fibre fishtail array A. An optical fibre fishtail array is illustrated schematically in FIG. 5, in which light from a single source at H at the bunched end of a plurality of fibre optics $F_1, F_2 \ldots F_n$ is conveyed to the other ends $E_1 \ldots E_n$ of the optical fibres, these other ends forming a linear array and being accurately parallel so that the angle of incidence of light on the banknote is the same for each of the adjacent regions.

In order to distinguish between diffuse and specular reflection of light, it is essential to use collimated beams of light. These can be produced by using a lens between the fishtail array and the illuminated surface. However, we have found it preferable to dispense with lenses and to make the numerical aperture (NA) of each optical fibre a small number. The smaller the NA, the smaller the semi-angle of the cone of light accepted by the optical fibre or emitted by the optical fibre. The light emitted from optical fibres with an NA of 0.19 has an acceptance cone semi-angle of around 10°, which gives a beam adequately collimated for the present invention.

Collimated light beams from the optical fibres A and spanning the entire lengths of the banknote are reflected in the surface of the banknote. Reflected beams are collected by the linear arrays of the lower ends of the fibres B, C and D, the angle of incidence in this example being 30°, giving a total angular of specular reflection of 60°.

The lower ends of the optical fibres D form a line of 16 bundles and these convey light which has been specularly reflected at the banknote surface respectively to 16 photodetectors at their upper ends $D_1, D_2 \ldots D_n$. In a similar way, a line of 16 bundles of optical fibres B collect light which has been diffusely reflected from the banknote surface and convey this light respectively to 16 photodetectors at their upper ends $B_1, B_2 \ldots B_n$. In this case, the diffuse light collected is that which has been reflected back substantially along the path of the incident light, although any angle of reflection (other than the angle of specular reflection) can be used.

The optical fibres C form a fishtail array which collects light specularly reflected from elemental areas in a region (or regions) of the banknote, a single photodetector responding to the sum of the intensities from all these elemental areas. The optical fibres of the single fishtail array C shown in FIG. 1 have a standard numerical aperture of about 0.55. The intensity signal produced by the single photodetector is processed to determine the soil level of the note and forms no part of the present invention. The length of the lower end of the fishtail array C may exceed the length of the banknote, making the system independent of slight variations in the lateral position of the banknote, provided that the surface on which the banknote is mounted has a uniform reflectivity, e.g. matt black. The scanning and analysing of banknotes using apparatus of this form is described more fully in our published European Patent Application No. 0072237A.

The wavelength of the light to be used for detecting shiny tape is not critical but visible light has been found particularly convenient. In addition, for the detection of soiling, blue-white light (for example from a tungsten halogen lamp), gives good results and therefore a miniature halogen lamp is used in the apparatus illustrated. In this respect, the apparatus operates under conditions similar to those of a human sorter who works in daylight or fluorescent light.

In the example shown, the total length of the detector head is 250 mm. It would be possible to double the resolution of the system by using 32 photodetectors in a line.

Figure 4:
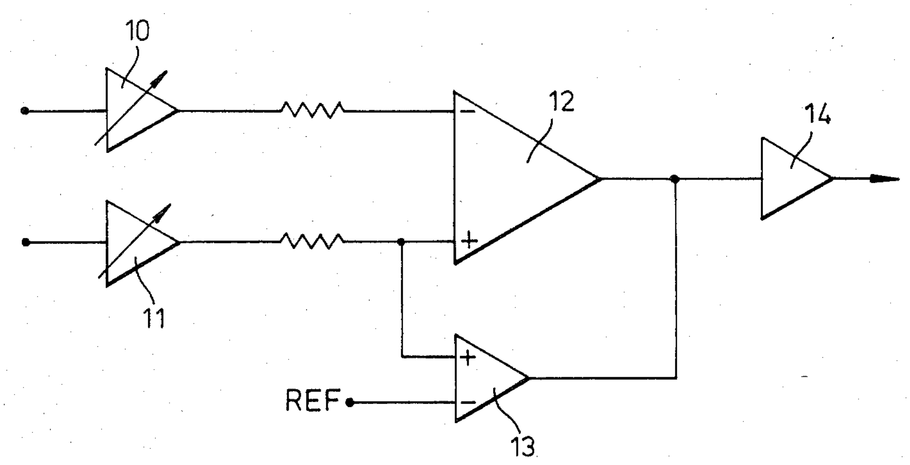
FIG. 4 shows a circuit responsive to the ratio of specular to diffuse reflection.

FIG. 4 shows the circuit used for each pair of photodetectors, for example those at the ends $B_1$ and $D_1$ of the fibre arrays B and D. In FIG. 4, the signal outputs $VB_1$ and $VD_1$ are individually amplified in variable-gain amplifiers 10 and 11, the gains of which are adjusted so that the signal output from amplifier 11 is lower by a given percentage than the signal output of amplifier 10. These adjustments are made while the detector head is sensing a matt white reference surface. The amplified signals are fed into a comparator 12. When the output of amplifier 11 exceeds that of amplifier 10, indicating that the ratio of specular reflection to diffuse reflection has increased, the comparator switches. The signal produced by the switching of comparator 12 is normally indicative of the detection of shiny tape. However, the ratio of specular reflection to diffuse reflection may increase when the magnitudes of the signals are very low, in the presence of electrical noise, or if the surface from which the low signals are derived is a semi-matt black or darkly coloured surface. To overcome this problem, the signal derived from specular reflection is also applied to a comparator 13 in which it is compared with a threshold signal. The amplifier 14 passes signals from comparator 12 only when comparator 13 indicates that the magnitudes of the signals derived from reflection of the light exceed the threshold value.

It is generally more important to collimate the incident beam of light than the reflected beam. In the above example, the numerical aperture for the fibres A have acceptance cones with semi-angles of about 10°. For the fibres of arrays B, C and D, the semi-angles of the acceptance cones can be about 30°.

Although the preferred embodiments of the invention use optical fibres, it is nevertheless practicable to use a lens system for collimating the incident and reflected beams, without optical fibres.

As the banknote may have shiny tape or its other face, if desired a second and similar detector head may be positioned at a different point along the path of the banknote and on the other side of this path.

I claim:

1. Apparatus for sensing the condition of the surface of a moving printed document, comprising:

(a) illuminating means (A) including a plurality of optical fibres for guiding light to the surface of the document, said fibres having laterally spaced light-emitting ends with a low numerical aperture to direct collimated beams of light at a plurality of adjacent regions in a line across the document in a direction transverse to its movement;

(b) a pair of first and second light receivers for each illuminated region of the document, each pair including individual first and second photoelectric means and associated optical fibres leading to the individual photoelectric means;

(c) light-receiving ends of the optical fibers of the first light receivers (D) being laterally spaced across the path of document movement for receiving light specularly reflected from the plurality of adjacent illuminated regions, and the associated first photoelectric means providing corresponding first electrical signals;

(d) light-receiving ends of the optical fibers of the second light receivers (B) being laterally spaced across the path of document movement for receiving light diffusely reflected from corresponding ones of said regions, and the associated second photoelectric means providing corresponding second electrical signals; and (e) signal-analyzing means (10–14) for receiving the signals from each pair of first and second light receivers and responsive, for each pair, to an increase in the ratio of the instantaneous values of the first and second signals, representing respectively light reflected specularly and diffusely from the corresponding illuminated region, to provide a signal output indicative of the presence of shiny tape on the illuminated surface of the document.

2. Apparatus as claimed in claim 1, wherein the light-emitting ends of the optical fibers of the illuminating means, the light-receiving ends of the optical fibers of the first light receivers, and the light-receiving ends of the optical fibers of the second light-receivers are fixed relative to one another in three parallel lines in a single detector head.

3. Apparatus in accordance with claim 1, wherein the light-emitting ends of the optical fibers of the illuminating means have a numerical aperture value of less than 0.3.

4. Apparatus in accordance with claim 3, wherein the numerical aperture value is approximately 0.19.

5. Apparatus in accordance with claim 1, wherein the light with which the document is illuminated is in the visible region of the spectrum.

* * * * *